United States Patent [19]
Pinkos et al.

[11] Patent Number: 5,730,531
[45] Date of Patent: Mar. 24, 1998

[54] CENTER BEARING ASSEMBLY WITH RHEOLOGICAL FLUID FOR DAMPING VIBRATIONS

[75] Inventors: Andrew F. Pinkos, Clarkston, Mich.; Emil M. Shtarkman, Marina Del Rey, Calif.

[73] Assignee: TRW Inc., Lyndhurst, Ohio

[21] Appl. No.: 823,291

[22] Filed: Mar. 21, 1997

[51] Int. Cl.$^6$ ..................................................... F16C 27/04
[52] U.S. Cl. ........................ 384/99; 384/446; 384/544
[58] Field of Search ................................. 384/446, 448, 384/99, 544, 589

[56] References Cited

U.S. PATENT DOCUMENTS

| | | |
|---|---|---|
| 4,200,003 | 4/1980 | Miller . |
| 4,337,982 | 7/1982 | Moringiello et al. . |
| 4,392,694 | 7/1983 | Reynolds . |
| 4,867,655 | 9/1989 | Barbic et al. . |
| 4,921,229 | 5/1990 | Hori . |
| 5,029,677 | 7/1991 | Mitsui . |
| 5,354,488 | 10/1994 | Shtarkman et al. . |
| 5,452,957 | 9/1995 | Duggan . |

OTHER PUBLICATIONS

*Universal Joint and Driveshaft Design Manual*, Advances in Engineering Series, No. 7, Chapter 6, Shaft Support Bearings, pp. 201–206, The Society of Automotive Engineers, Inc., 400 Commonwealth Ave., Warrendale, PA 15096 (date unknown).

*Primary Examiner*—Lenard A. Footland
*Attorney, Agent, or Firm*—Tarolli, Sundheim, Covell, Tummino & Szabo

[57] ABSTRACT

An apparatus (10) includes a vehicle drive shaft (12), a roller bearing (16) supporting the drive shaft (12) for rotation, and a housing (18) which contains and supports the roller bearing (16) in a vehicle. The roller bearing (16) includes an inner race (34) rotatable within an outer race (36). The apparatus (10) further includes a damper assembly (20) which damps vibrations radially between the roller bearing (16) and the housing (18). The damper assembly (20) defines a closed chamber (150) containing rheological fluid (152), and has a flow-inducing part (80) projecting into the fluid (152). The flow-inducing part (80) of the damper assembly (20) is movable radially within the fluid (152) in response to radial vibrations of the outer bearing race (36).

17 Claims, 2 Drawing Sheets

5,730,531

1

CENTER BEARING ASSEMBLY WITH RHEOLOGICAL FLUID FOR DAMPING VIBRATIONS

FIELD OF THE INVENTION

The present invention relates to a center bearing assembly for a vehicle drive shaft, and particularly relates to a damper apparatus for damping vibrations in the center bearing assembly.

BACKGROUND OF THE INVENTION

A center bearing assembly supports a section of a vehicle drive shaft on the vehicle frame. The center bearing assembly includes a roller bearing which directly engages and supports the section of the drive shaft for rotation. The center bearing assembly further includes a housing which contains and supports the roller bearing on the vehicle frame.

When the drive shaft rotates, vibrations are transmitted radially through the center bearing assembly from the drive shaft to the vehicle frame. Therefore, the center bearing assembly further includes a damper apparatus for damping vibrations radially between the roller bearing and the housing.

SUMMARY OF THE INVENTION

In accordance with the present invention, an apparatus comprises a vehicle drive shaft and a center bearing assembly. The center bearing assembly includes a roller bearing and a housing. The roller bearing supports the drive shaft for rotation, and includes an inner race rotatable within an outer race. The housing contains and supports the roller bearing in a vehicle.

The apparatus further comprises a damper assembly which damps vibrations radially between the roller bearing and the housing. The damper assembly defines a closed chamber containing rheological fluid, and has a flow-inducing part projecting into the fluid. The flow-inducing part of the damper assembly is movable radially within the fluid in response to radial vibrations of the outer bearing race.

In a preferred embodiment of the present invention, the damper assembly has a pair of annular parts which are movable radially relative to one another in response to the radial vibrations of the outer bearing race. The flow-inducing part of the damper assembly comprises a damper blade projecting radially from one toward the other of the annular parts of the damper assembly. Preferably, the damper blade is one of a plurality of damper blades projecting radially into the fluid. Each damper blade comprises a circular ring with planar opposite side surfaces and a free edge surface movable within the fluid.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

2

DESCRIPTION OF A PREFERRED EMBODIMENT

Figure 1:
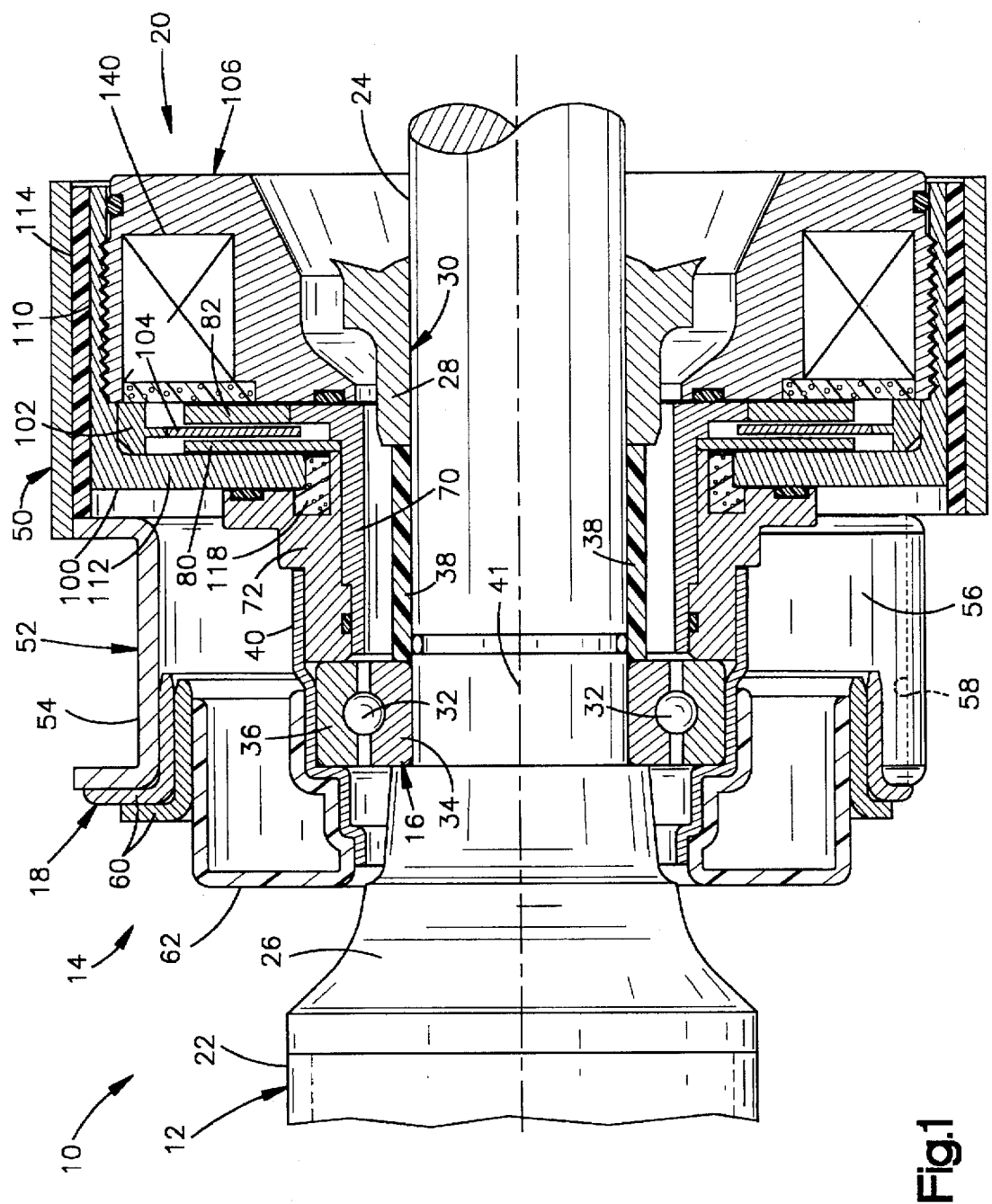
FIG. 1 is a view of an apparatus comprising a preferred embodiment of the present invention.

An apparatus 10 comprising a preferred embodiment of the present invention is shown in FIG. 1. The apparatus 10 includes a vehicle drive shaft 12 and a center bearing assembly 14. The center bearing assembly 14 includes a roller bearing 16 which supports the drive shaft 12 for rotation. The center bearing assembly 14 further includes an annular housing 18 which contains and supports the roller bearing 16 on a vehicle frame. A damper assembly 20 also is contained within the housing 18. The damper assembly 20 damps vibrations radially between the roller bearing 16 and the housing 18.

The drive shaft 12 has a plurality of interconnected sections which rotate together to transmit torque from a vehicle transmission to a differential gear at a driven rear axle of the vehicle. As shown partially in FIG. 1, the sections of the drive shaft 12 include a midship tube 22 and a center shaft 24. The midship tube 22 is fixed to an enlarged forward end portion 26 of the center shaft 24. A yoke 28 in a universal joint 30 (shown partially) is fixed to a rear end portion of the center shaft 24. The universal joint 30 rotatably joins the center shaft 24 with another section (not shown) of the drive shaft 12 in a known manner. Any suitable fastening structures known in the art, such as welds, splines, pins, or the like, can be used to interconnect the midship tube 22, the center shaft 24, and the yoke 28, as well as other interconnected parts of the apparatus 10 described below. Such fastening structures are omitted from the drawings for clarity of illustration.

The roller bearing 16 has a plurality of rollers 32 between an inner race 34 and an outer race 36. The inner race 34 is fixed to the center shaft 24 between the enlarged end portion 26 and a cylindrical spacer tube 38. The spacer tube 38 extends axially over the center shaft 24 from the inner race 34 to the yoke 28. The outer race 36 is closely received within, and is fixed to, a crimped tubular wall portion 40 of the center bearing assembly 14. The center shaft 24 and the inner race 34 are thus rotatable together about an axis 41 relative to the outer race 36 and the surrounding center bearing assembly 14.

A rear wall 50 of the housing 18 is shaped as a cylindrical tube extending circumferentially entirely around the axis 41. A forward wall 52 of the housing 18 has a channel-shaped cross section, and extends only partially around the axis 41. Specifically, an upper portion 54 of the forward housing wall 52 extends circumferentially around the upper half of the center bearing assembly 14 in the shape of a semi-circular arc. A pair of parallel arm portions 56 of the forward housing wall 52, one of which is shown in the sectional view of FIG. 1, project tangentially downward on opposite sides of the lower half of the center bearing assembly 14. A corresponding pair of mounting portions 58 project oppositely outward (in directions perpendicular to the page as viewed in FIG. 1) from the lower ends of the arm portions 56. The mounting portions 58 of the forward housing wall 52 are used to mount the center bearing assembly 14 on a vehicle frame in a known manner. A pair of concentric rings 60 and a rubber seal 62 close the forward end of the center bearing assembly 14 radially outward of the crimped tubular wall 40.

The damper assembly 20 comprises a plurality of annular parts located radially between the center shaft 24 and the housing 18. These include a sleeve 70 and an inner ring 72. The sleeve 70 is a relatively thin cylindrical part which is press fitted into the inner ring 72. The inner ring 72 has a somewhat conical configuration which is stepped radially outward, and extends closely into the crimped tubular wall 40. A weld or, as noted above, any other suitable fastening structure fixes the inner ring 72 to the crimped tubular wall 40. In this arrangement, the sleeve 70 and the inner ring 72 are fixed to the outer bearing race 36 so as to vibrate radially with the outer bearing race 36.

A pair of damper blades 80 and 82 project radially outward from the sleeve 70 at locations that are spaced a short distance from one another. The first damper blade 80 is a flat circular ring. The first damper blade 80 thus has a radially outer free edge surface 86 (FIG. 2) and a pair of planar opposite side surfaces 88. The second damper blade 82 also is a flat circular ring with a radially outer free edge surface 92 and a pair of planar opposite side surfaces 94. A corresponding pair of fastening structures (preferably welds) fixes the first and second damper rings 80 and 82 to the sleeve 70. Accordingly, the first and second damper rings 80 and 82 also are fixed to the outer bearing race 36 so as to vibrate radially with the outer bearing race 36.

Several of the annular parts of the damper assembly 20 are not fixed to the outer bearing race 36. As shown in FIG. 1, such parts include a pair of support rings 100 and 102, a third damper blade 104, and an electromagnetic field assembly 106. Those parts 100–106 are supported for vibrational movement radially relative to the sleeve 70, the ring 72, and the outer bearing race 36.

The first support ring 100 has an L-shaped cross section defined by a cylindrical side wall 110 and a ring-shaped end wall 112. The side wall 110 and a surrounding plastic bushing 114 are press fitted together within the rear housing wall 50. The end wall 112 projects radially inward from the side wall 110, and can slide radially against an adjacent portion 115 of the inner ring 72. A radially inner edge portion 116 (FIG. 2) of the end wall 112 compressively holds a closed-cell foam insert 118 in a groove 120 in the inner ring 72.

Figure 2:
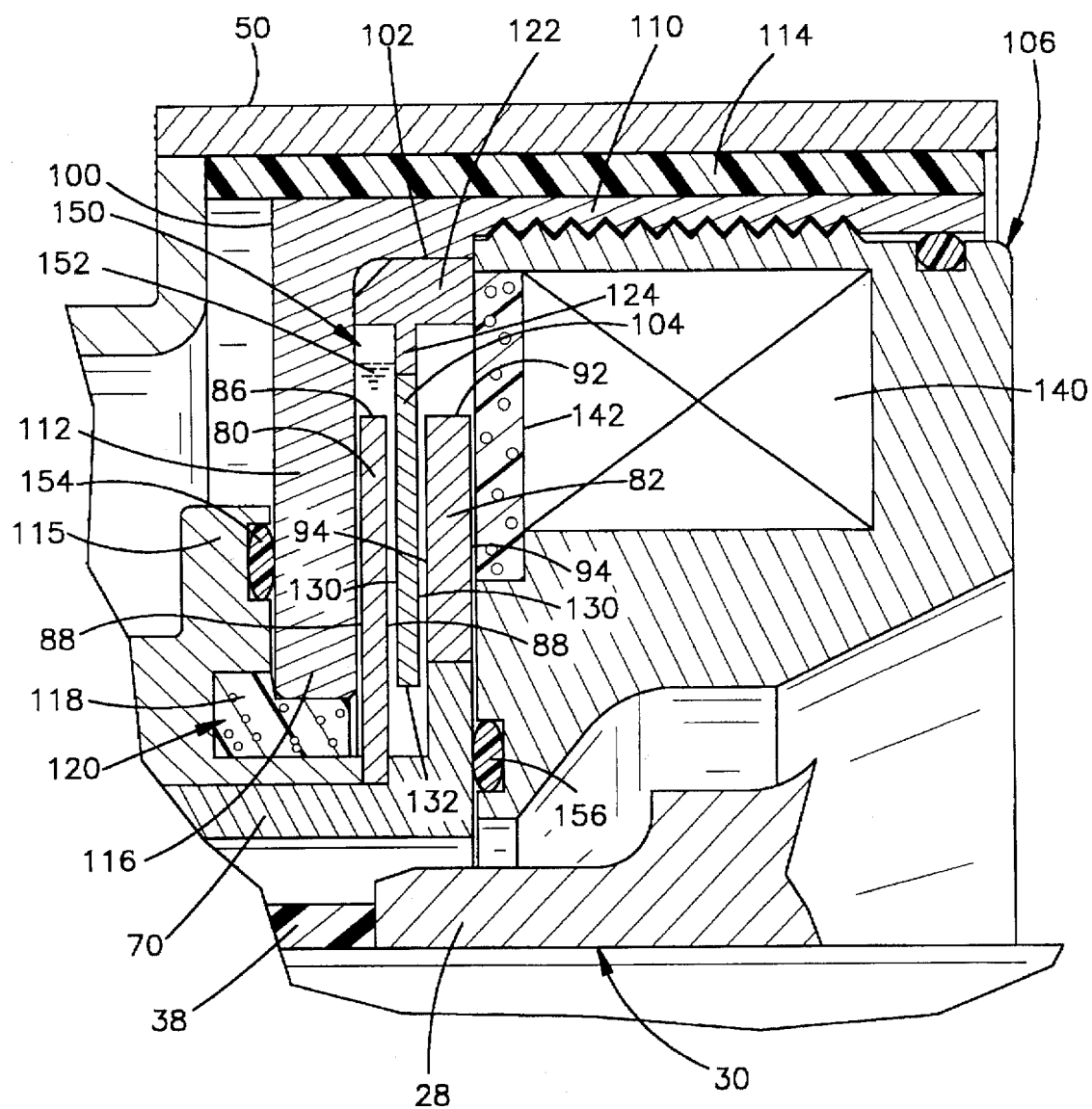
FIG. 2 is an enlarged partial view of parts shown in FIG. 1.

As further shown in FIG. 2, the second support ring 102 has a generally T-shaped cross section defined by a rim portion 122 and a flange portion 124. The third damper blade 104, which also is a flat circular ring, is fixed to the flange portion 124 of the second support ring 102 (preferably by a weld), and projects radially inward from the flange portion 124 between the first and second damper blades 80 and 82. The third damper blade 104 has a radially inner free edge surface 130 and pair of planar opposite side surfaces 132. The opposite side surfaces 132 of the third damper blade 104 are spaced axially from the adjacent side surfaces 88 and 94 of the first and second damper blades 80 and 82. Since the third damper blade 104 is fixed to the support rings 100 and 102, it is likewise movable radially to the inner ring 72 and the sleeve 70. The third damper blade 104 is thus movable radially relative to the first and second damper blades 80 and 82 upon radial vibration of the outer bearing race 36.

The electromagnetic field assembly 106 is screwed into the first retainer ring 100 at the cylindrical side wall 110 of the first retainer ring 100. A coil 140 (shown schematically) in the electromagnetic field assembly 106 extends circumferentially around the axis 41. Another closed-cell foam insert 142 overlies the coil 140.

The damper assembly 20 defines a closed fluid chamber 150 which is filled with rheological fluid 152. In the preferred embodiment of the present invention, the fluid 152 is a magnetic field responsive fluid and may have any suitable composition known in the art. The chamber 150 has an annular shape extending circumferentially around the axis 41. As best shown in enlarged detail in FIG. 2, the chamber 150 extends axially between the electromagnetic field assembly 106 and the end wall 112 of the first support ring 100. The chamber 150 further extends radially between the sleeve 70 and the rim portion 122 of the second support ring 102. The damper blades 80, 82 and 104 thus project radially into the fluid 152 in the chamber 150. The foam inserts 118 and 142 and a pair of O-rings 154 and 156 block the fluid 152 from leaking outward from the chamber 150.

Figure 3:
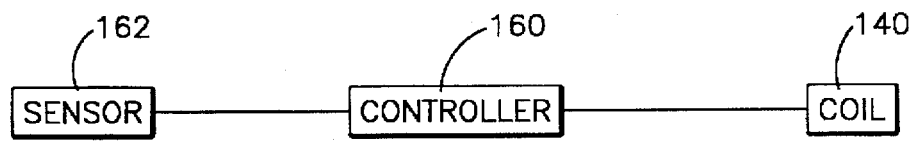
FIG. 3 a schematic view showing other parts of the apparatus.

As shown schematically in FIG. 3, the coil 140 is operatively connected with a controller 160 and a sensor 162. The controller 160 responds to the sensor 162 by energizing the coil 140, i.e., by directing electric current through the coil 140, in an amount correlated to a vehicle operating condition that is sensed and indicated by the sensor 162. In the preferred embodiment of the present invention, the vehicle operating condition is the speed of the rotating drive shaft 12. When the speed of the rotating drive shaft 12 is within a predetermined range of relatively low speeds, the controller 160 directs electric current through the coil 140 and varies the current inversely relative to variations in the shaft speed. The resulting magnetic field has lines of flux that extend from the electromagnetic field assembly 106 (FIG. 1) through the rheological fluid 152 in the chamber 150. In accordance with this feature of the present invention, the damper blades 80, 82 and 104 are formed of magnetic material, such as 1008 steel or soft iron, so as not to block the lines of magnetic flux from extending fully through the fluid 152 between their opposed side surfaces 88, 130 and 94.

When the controller 160 varies the current in the coil 140 in response to variations in the speed of the rotating drive shaft 12, the intensity of the magnetic field acting upon the fluid 152 in the chamber 150 varies accordingly. This causes the resistance to shear of the fluid 152 to vary in corresponding amounts. The fluid 152 thus resists movement of the damper blades 80, 82 and 104 radially relative to each other in the chamber 150 so as to damp radial vibrations of the outer bearing race 36 in an amount correlated to the speed of the rotating drive shaft 12.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:.

a vehicle drive shaft;

a rolling bearing supporting said drive shaft for rotation, said rolling bearing including an inner race rotatable within an outer race;

a housing which contains and supports said roller bearing in a vehicle; and a damper assembly which damps vibrations radially between said rolling bearing and said housing;

said damper assembly defining a closed chamber containing rheological fluid and having a flow-inducing part projecting into said fluid, said flow-inducing part being movable radially within said fluid in response to radial vibrations of said outer race.

2. Apparatus as defined in claim 1 wherein said fluid is a magnetic field responsive fluid, said flow inducing part of said damper assembly being formed of magnetic material.

3. Apparatus as defined in claim 1 wherein said damper assembly further has a pair of annular parts which are movable radially relative to one another in response to said radial vibrations of said outer race, said flow-inducing part of said damper assembly comprising a damper blade projecting radially from one toward the other of said annular parts.

4. Apparatus as defined in claim 3 wherein said damper blade and said one of said annular parts are fixed to said outer race.

5. Apparatus as defined in claim 3 wherein said damper blade comprises a circular ring with planar opposite side surfaces and a free edge surface movable within said fluid.

6. Apparatus as defined in claim 5 wherein said damper blade is one of a plurality of damper blades projecting radially into said fluid, each of said damper blades comprising a circular ring with planar opposite side surfaces and a free edge surface movable within said fluid.

7. Apparatus as defined in claim 6 wherein said damper blades comprise a pair of axially adjacent damper blades projecting oppositely from said annular parts of said damper structure.

8. Apparatus as defined in claim 7 wherein said adjacent damper blades are spaced apart axially across a fluid flow space within said chamber.

9. Apparatus as defined in claim 8 wherein said fluid is a magnetic field responsive fluid, said apparatus further comprising an electric coil which, when energized, generates a magnetic field which acts upon said fluid.

10. Apparatus comprising:
   a rolling bearing including an inner race rotatable within an outer race; and
   a damper assembly defining a closed chamber containing rheological fluid, said damper assembly including a pair of annular parts which are movable radially relative to one another in response to radial vibrations of said outer race;
   said damper assembly further including a damper blade projecting radially into said fluid from one toward the other of said annular parts, said damper blade being movable radially within said fluid in response to said radial vibrations of said outer race.

11. Apparatus as defined in claim 10 wherein said fluid is a magnetic field responsive fluid, said damper blade being formed of magnetic material.

12. Apparatus as defined in claim 10 wherein said damper blade and said one of said annular parts are fixed to said outer race.

13. Apparatus as defined in claim 10 wherein said damper blade comprises a circular ring with planar opposite side surfaces and a free edge surface movable within said fluid.

14. Apparatus as defined in claim 10 wherein said damper blade is one of a plurality of damper blades projecting radially into said fluid, each of said damper blades comprises a circular ring with planar opposite side surfaces and a free edge surface movable within said fluid.

15. Apparatus as defined in claim 14 wherein said damper blades comprise a pair of axially adjacent damper blades projecting oppositely from said annular parts of said damper structure.

16. Apparatus as defined in claim 15 wherein said adjacent damper blades are spaced apart axially across a fluid flow space within said chamber.

17. Apparatus as defined in claim 16 wherein said fluid is a magnetic field responsive fluid, said apparatus further comprising an electric coil which, when energized, generates a magnetic field which acts upon said fluid.

* * * * *